3,070,563
Patented Dec. 25, 1962

3,070,563
RESINOUS POLYCARBONATE PLASTICIZED WITH A TERTIARY ALKYL POLYETHOXY AMINE
Nicholas C. Bolgiano, Manor Township, Lancaster County, Pa., assignor to Armstrong Cork Company, Lancaster, Pa., a corporation of Pennsylvania
No Drawing. Filed June 14, 1960, Ser. No. 35,881
7 Claims. (Cl. 260—32.6)

This invention relates generally to resinous polycarbonates and more particularly to a plasticized composition of a polycarbonate resin.

Due to the nature of the polycarbonate chain, plasticization of polycarbonate resins has presented a problem. Ordinary plasticizers such as the phosphite esters, phthalate esters, oils, polymeric plasticizers, and fatty acids, are generally incompatible with polycarbonate resins and unsuitable as plasticizers therefor.

It is a primary object of the present invention to supply a plasticized composition comprising polycarbonate resins. It is a further object to supply a process for plasticizing polycarbonate resins.

These objects are achieved in a simple and effective manner. The invention contemplates a plasticized composition comprising a resinous polycarbonate and a plasticizing amount of a tertiary-alkyl polyethoxy amine.

The polycarbonates which form the resinous component of the composition of the present invention are most readily prepared by the reaction in a suitable solvent system of a bis-phenol and phosgene. Various bis-phenols may be used, and mixtures of bis-phenols may be used. In general, the structure of these polycarbonate resins may be said to be (1)
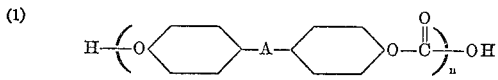

wherein A is a divalent radical which may be a hydrocarbon or an organic acid or an organic ester or any divalent group serving to link the two phenolic nuclei. In (1), n will be a number sufficiently large to give a suitable molecular weight for the resin, usually in the range of about 10,000–500,000. It will be appreciated that if mixtures of bis-phenols have been used in the preparation of the polycarbonate resin, (1) will vary along the polymeric chain as the different molecules of the different bis-phenols occur in the chain. Some polycarbonates are prepared using varying amounts of trifunctional bis-phenols which serve as branching centers in the polymeric chain. Formula 1 does not exactly reflect this type of polycarbonate. The polycarbonates to be plasticized in accordance with the present invention will all possess the repetitive carbonate group (2)

and in addition will always have the (3)

radical attached to a carbonate group.

The polyethoxy amines which serve as plasticizers in accordance with the present invention are the reaction products of ethylene oxide and long chain tertiary-alkyl primary amines. These amines are primary aliphatic amines with highly branched alkyl chains. The primary amino nitrogen is directly attached to a tertiary carbon atom so that the amines all contain the structure (4)
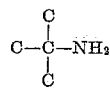

The chain lengths of the amines used to make the polyethoxy amines vary from $C_{18}$ to $C_{24}$. Hence these amines are a mixture of 18–24 carbon amines. This mixture may be purchased as such under the name "Primene JM-T."

The 18–24 carbon tertiary alkyl primary amines are reacted with ethylene oxide in order to produce the polyethoxy amines useful as a plasticizer for polycarbonates. The amount of ethylene oxide used is about 25 moles of ethylene oxide per mole of individual amine chain in order to obtain the requisite compatibility of the polyethoxy amine with a polycarbonate. Hence the formula for the plasticizers of the present invention may be stated to be (5)     $t\text{-}C_{18-24}H_{37-49}NH\text{-}(CH_2CH_2)_{25}H$ This polyethoxy amine may be purchased as such under the trade name "Priminox 32."

The polycarbonates and the polyethoxy amine plasticizers may be admixed by dissolving both compounds in an inert solvent such as the chlorinated hydrocarbon solvents, for example, methylene chloride, chlorobenzene, ethylene dichloride, dichloroethylene, or in other solvents such as dioxane or dimethylformamide. The two compounds may be blended in any other convenient manner, as by softening the polycarbonate resin on a warm mill and working in the polyethoxy amine, which is in the form of a waxy solid.

For most purposes, a satisfactory composition will be one containing the polyethoxy amine in an amount of about 10% by weight of the polycarbonate-polyethoxy amine composition. The plasticizing effect of the polyethoxy amine becomes noticeable at about 2% by weight of the amine. Amounts up to about 50% by weight of the amine, all based on the weight of the polycarbonate-polyethoxy amine mixture, are suitable.

The following example illustrates an embodiment of the invention.

*Example*

To 300 parts by weight of methylene chloride was added 45 parts by weight of a polycarbonate resin which is the reaction product of phosgene and 2,2-bis-(4 hydroxyl phenyl) propane. There was also added 5 parts by weight of the reaction product of ethylene oxide with a mixture of primary, aliphatic tertiary-alkyl amines to produce a polyethoxy compound having the formula $t\text{-}C_{18-24}H_{37-49}NH\text{-}(CH_2CH_2O)_{25}H$ The solids were taken up in solution. The resulting solution was poured onto a glass plate and allowed to stand for 24 hours to deposit a film 4 mils thick. The resulting film was smooth, clear and tough. After standing for one month no noticeable change had occurred in the film. The film was softer and more flexible and possessed less of a tinny sound than an identical film made in the absence of the polyethoxy amine.

I claim:
1. A plasticized composition comprising a resinous polycarbonate possessing the repetitive carbonate group

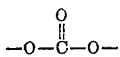

having attached thereto the radical,

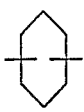

containing a plasticizing amount of a tertiary-alkyl polyethoxy amine containing about 25 moles of ethylene oxide per mole of individual amine chain, and wherein the alkyl group contains 18–24 carbon atoms.

2. A composition according to claim 1 wherein said amine has the formula $$t\text{-}C_{18-24}H_{37-49}NH(CH_2CH_2O)_{25}H$$

3. A composition according to claim 1 wherein said amine is present in an amount of about 2%–50% by weight based on the weight of the polycarbonate and the amine.

4. A method according to claim 7 wherein said amine has the formula $$t\text{-}C_{18-24}H_{37-49}NH(CH_2CH_2O)_{25}H$$

5. A method according to claim 7 wherein about 2%–50% by weight of said amine based on the weight of the polycarbonate and amine is utilized.

6. A method according to claim 7 wherein said amine is incorporated in said polycarbonate in an inert solvent for said polycarbonate.

7. The method of plasticizing a resinous polycarbonate possessing the repetitive carbonate group

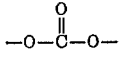

having attached thereto the radical,

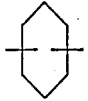

comprising incorporating therein a plasticizing amount of a tertiary-alkyl polyethoxy amine containing about 25 moles of ethylene oxide per mole of individual amine chain, and wherein the alkyl group contains 18–24 carbon atoms.

No references cited.